United States Patent
Arita

[11] 3,813,518
[45] May 28, 1974

[54] APPARATUS FOR MEASURING THE TEMPERATURE OF ROTARY BODIES

[76] Inventor: Koshei Arita, 10, 23 2-chome, Minamimagome, Ohota-ku, Tokyo, Japan

[22] Filed: Mar. 7, 1972

[21] Appl. No.: 232,554

[52] U.S. Cl............................ 219/471, 73/351
[51] Int. Cl..................... G01k 13/08, H05b 1/02
[58] Field of Search ...... 73/351; 219/469, 470, 471

[56] References Cited
UNITED STATES PATENTS

| 3,540,281 | 11/1970 | Inaba | 73/351 |
| 3,612,830 | 10/1971 | Dienes | 219/471 |
| 3,648,522 | 3/1972 | Hafeli | 73/351 |

FOREIGN PATENTS OR APPLICATIONS

| 1,160,378 | 8/1969 | Great Britain | 219/471 |

Primary Examiner—Richard C. Queisser
Assistant Examiner—Denis E. Corr
Attorney, Agent, or Firm—Charles W. Helzer

[57] ABSTRACT

In apparatus for measuring the temperature of a rotary body, a slot is formed around the periphery of the rotary body in the radial direction thereof and a temperature measuring element is positioned to ride in the slot as the body is rotated.

6 Claims, 4 Drawing Figures

APPARATUS FOR MEASURING THE TEMPERATURE OF ROTARY BODIES

BACKGROUND OF THE INVENTION

1. Field of Invention

This invention relates to an apparatus for measuring the temperature of a rotary body, and more particularly to a rotary body for heating synthetic fibers, chemical fibers and like fibers which are extremely sensitive to the fluctuation of heating temperature.

2. Prior Art Problem

Heretofore, apparatus such as that illustrated in FIGS. 1 and 2 have been used for measuring the temperature of a rotary body. In the arrangement shown in FIG. 1, instead of directly measuring the temperature of the rotary body, the temperature of a heating unit is detected from which the temperature of the rotary body is calculated. More particulary, a rotary member in the form of a cup 1 is mounted on a horizontal shaft 3 and a stationary annular heating unit 2 is mounted in the space within the rotary body 1. One or a plurality of axially extending temperature measuring elements, such as thermometers 4, are embedded in the heating body to indirectly measure the temperature of the rotary body. According to this arrangement, however, since the gap 5 between the heating unit and the rotary body greatly influences the temperature differential therebetween, it is necessary to precisely finish both the heating element and the rotary body thus requiring high skill of assembling and mounting of the component parts.

According to the arrangement shown in FIG. 2, temperature measuring elements, such as thermopiles 4 are received in axially extending slots in the peripheral portion of the rotary body. However, the difference in the extent of insertion of the temperature measuring elements in the slots caused by the non-uniform temperature distribution of the slots, affects the correct indication of the temperature of the rotary body 1. Furthermore, where the axial length of the rotary body is short, it is necessary to decrease the thermal capacity of the temperature measuring elements.

SUMMARY OF THE INVENTION

It is an object of this invention to provide improved apparatus for measuring the temperature of a rotary body which can obviate the disadvantages described above.

According to this invention there is provided apparatus for measuring the temperature of a rotary body characterized in that a slot is formed through the periphery of the rotary body in the radial direction thereof and in that a temperature measuring element is positioned in the slot. The rotary body takes the form of a cup and a stationary heating member is positioned in the space within the cup-shaped body.

DESCRIPTION OF THE PREFERRED EMBODIMENT

Figure 1:
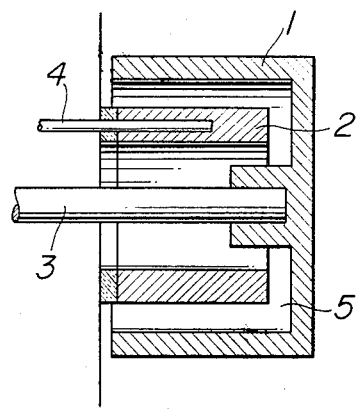
FIGS. 1 and 2 are diagrammatic representations of the prior art apparatus for measuring the temperature of a rotary body described above.
Figure 2:
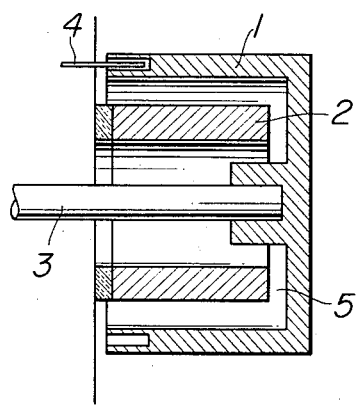
Figure 3:
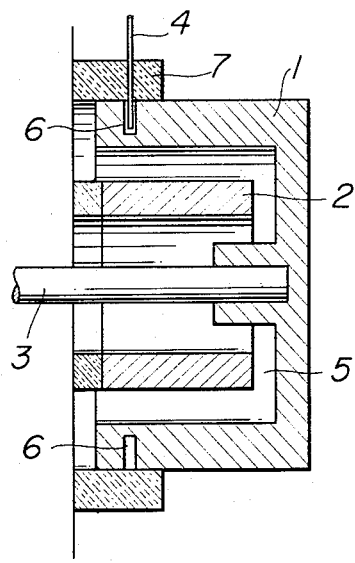
FIG. 3 is a diagrammatic representation of the novel measuring apparatus embodying the present invention.

The relation between the rotary body 1 and the heating body of the embodiment shown in FIG. 3 is identical to those shown in FIGS. 1 and 2. According to this invention, radially extending slots 6 are provided for the rotary body around the outer periphery thereof for receiving temperature measuring elements 4 therein. The openings of the slots 6 is closed by an annular heat insulating member 7 for preventing outflow of the air contained in the slots.

With this arrangement, it is possible to measure with high accuracy the temperature of the rotary body thus detecting the temperature variation of the rotary body caused by the variations in the number of revolutions and the load. The result of measurement may be used to control the temperature of the rotary body or to prevent the variation thereof. Where a plurality of the novel temperature measuring apparatus are used, it is possible to maintain respective rotary bodies at the same temperature irrespective of the difference in the gap 5 between the heating body and the rotary body 1.

The results of experiments have shown that the temperature of the air contained in the slot 6 is very close to the surface temperature of the rotary body. It has also been found that the effect of the radiant heat from the heating body 2 upon the temperature measuring element 4 is minimized, and that the temperature of the air circulating with the rotary body is substantially the same as that of the rotary body. This is because the air is agitated by continuously impinging upon the temperature measuring element, and the temperature distribution in the slot is thus improved thereby minimizing the error caused by the difference in the length of the portion of the temperature measuring element received in the slot. Moreover, by appropriate positioning of the axial location of the slot along the length of the rotary body, a more accurate and reliable temperature profile of the surface of the rotary body is obtained.

Figure 4:
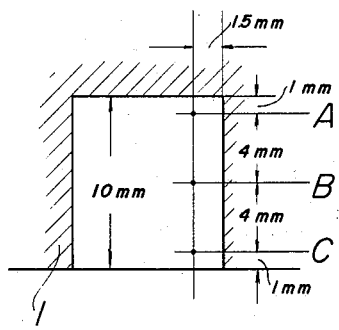
FIG. 4 is a diagram showing the relative positions of the component for measuring a temperature distribution and further illustrating the measuring apparatus of this invention.

Table 1 below shows the temperature distribution of the slot and Table 2 shows the comparision of the actual temperature of the rotary body and the measured values. The rotary body used in the measurement had an outer diameter of 100 mm, and was rotated at a peripheral speed of 60 m/min. The temperature was measured by contacting a strip-type thermocouple to the rotary body. The effect caused by the heat of friction was +1° C and this value was subtracted from the measured value. Three temperature measuring elements were positioned as shown in FIG. 4.

TABLE 1

| Temperature of the rotary body | 124° C | 146° C | 177° C |
|---|---|---|---|
| Positions of A | 123.5° C | 145.5° C | 176.5° C |
| the temperature means B | 124° C | 146° C | 176.5° C |
| elements C | 124° C | 146° C | 177° C |

TABLE 2

| Temperature of the rotary body | Temperature measured | gap lengths |
|---|---|---|
| 124° C | 124° C | 1.0 mm |
| 146° C | 146° C | 1.0 mm |
| 177° C | 176.5° C | 1.0 mm |

As can be noted from these Tables, the novel apparatus of this invention can measure the temperature of the rotary body with an extremely high accuracy never attainable by the prior art apparatus.

I claim:

1. Apparatus for measuring the temperature of a rotary body, said rotary body being characterized by at least one temperature sensing radially extending slot formed continuously around the periphery thereof with the slot having a peripheral open face and defined by two spaced-apart side walls formed in the periphery of the rotary body at an optimum distance along the axial length of the rotary body and of sufficient breadth and depth to accommodate at least one electrical temperature measuring element of the type for providing an electrical output indication of temperature, and fixed mounting means spaced closely adjacent the periphery of the rotary body for supporting at least one of said temperature measuring elements to ride within the open face of the slot as the body is rotated.

2. An apparatus according to claim 1, wherein the opening of said slot is closed by a heat insulator and the temperature measuring element is supported by the heat insulator so that the temperature sensing portion thereof rides in the slot.

3. An apparatus according to claim 1, wherein said rotary member is in the form of a cup-shaped cylindrical heating body with the slot being in the form of an annular ring around the outer periphery thereof, and a stationary heating unit is positioned in the space within said cup-shaped heating body.

4. An apparatus according to claim 3, wherein the opening of said slot is closed by a heat insulator and the temperature measuring element is supported by the heat insulator so that the temperature sensing portion thereof rides in the slot.

5. An apparatus according to claim 4, wherein there are a plurality of temperature elements positioned to ride within the slot as the body is rotated.

6. An apparatus according to claim 1, wherein there are a plurality of temperature elements positioned to ride within the slot as the body is rotated.

* * * * *